(12) United States Patent
Ichihara

(10) Patent No.: US 6,396,792 B1
(45) Date of Patent: May 28, 2002

(54) RECORDING METHOD OF A PHASE CHANGE OPTICAL RECORDING MEDIUM AND RECORDING APPARATUS

(75) Inventor: Katsutaro Ichihara, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/416,952

(22) Filed: Oct. 13, 1999

(30) Foreign Application Priority Data

Oct. 14, 1998 (JP) .......................................... 10-292263

(51) Int. Cl.⁷ ................................................ G11B 7/00
(52) U.S. Cl. ...................................................... 369/116
(58) Field of Search ............................ 369/47.5, 47.51, 369/116, 275.1, 47.52, 53.26, 53.27

(56) References Cited

U.S. PATENT DOCUMENTS 5,109,373 A    4/1992  Ohno et al.
6,031,803 A  *  2/2000  Kubota et al. ......... 369/47.5 X
6,236,635 B1 *  5/2001  Miyamoto et al. .......... 369/116

FOREIGN PATENT DOCUMENTS

JP          09-007176         1/1997

* cited by examiner

*Primary Examiner*—Paul W. Huber
(74) *Attorney, Agent, or Firm*—Oblon, Spivak, McClelland, Maier & Neustadt, P.C.

(57) ABSTRACT

Laser light used to make crystal space portions on a recording layer is divided into, and irradiated in, at least two kinds of steps. Thus, the recording layer can be maintained in a temperature zone increasing the crystal nuclei generating frequency and in a temperature zone increasing the crystal growth rate with a good balance between these temperature zones. Therefore, it is possible to remove "fail-to-erase" portions upon making crystal space portions by promotion of crystallization and to improve the overwrite erasability. It is especially effective in a mode for recording on a recording medium in a non-initialized status, i.e., in a mode for recording crystal spaces on an as-depo amorphous-state medium.

18 Claims, 4 Drawing Sheets

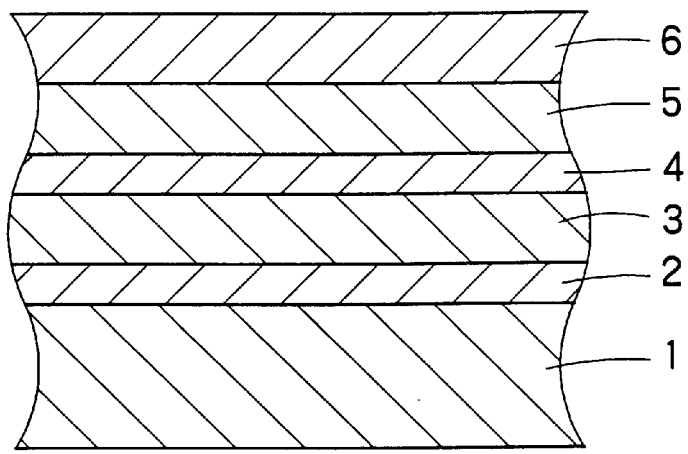
F I G. 2
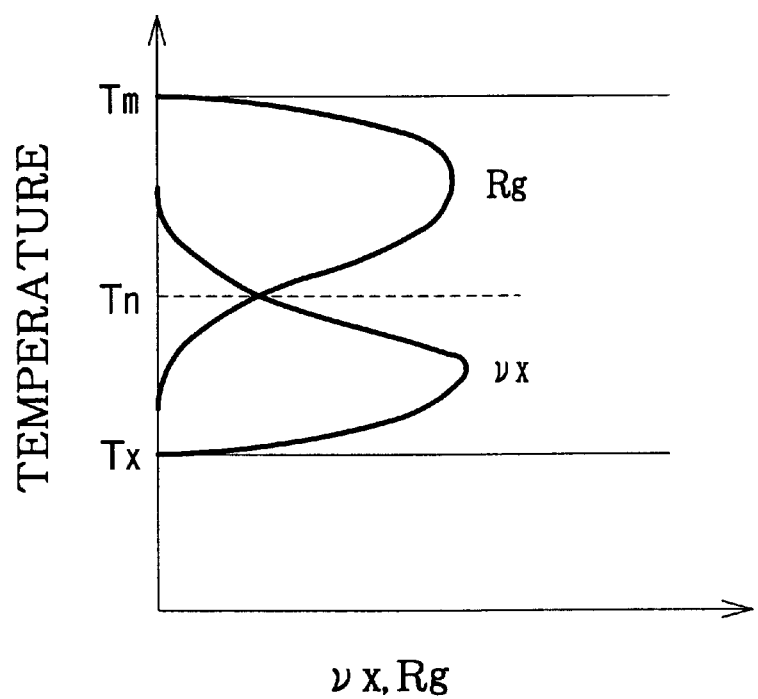
F I G. 3

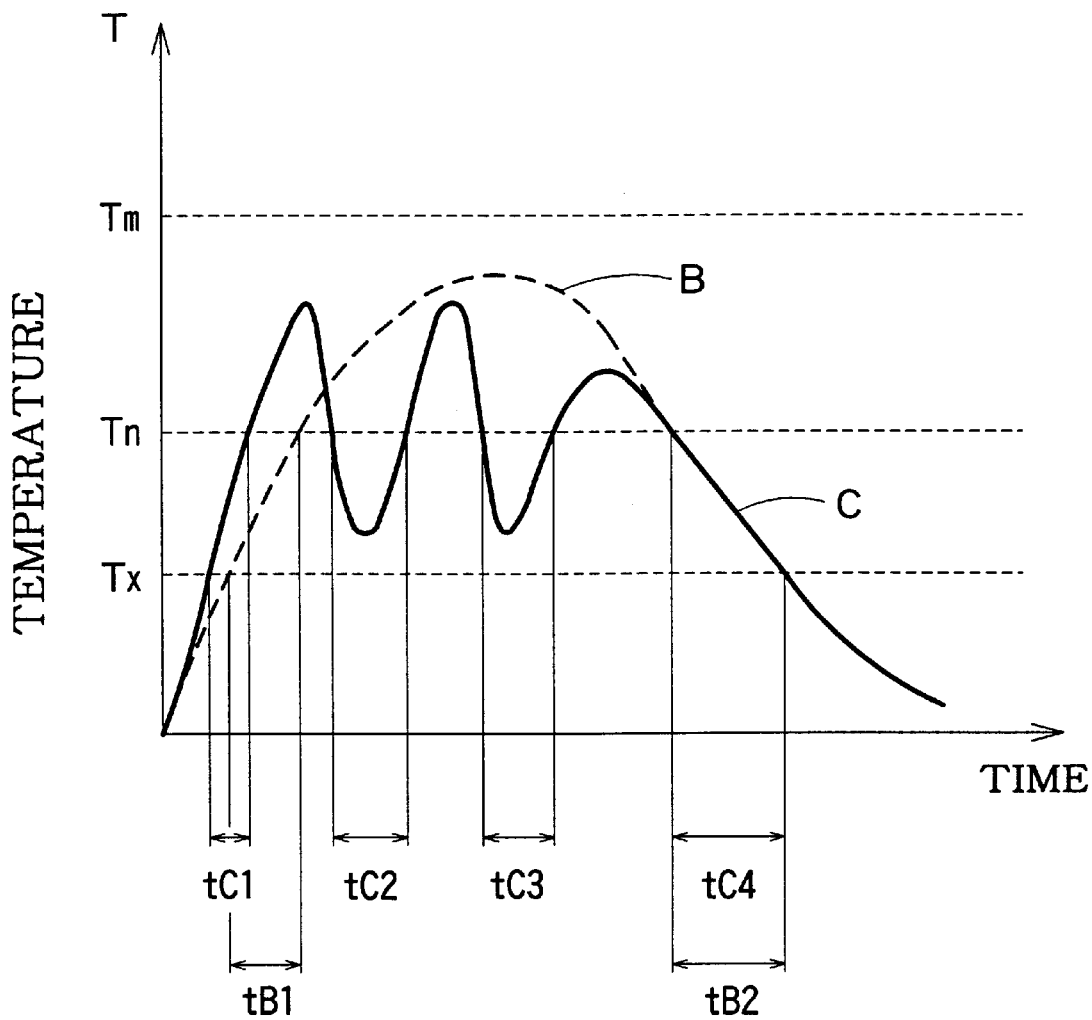
F I G. 4

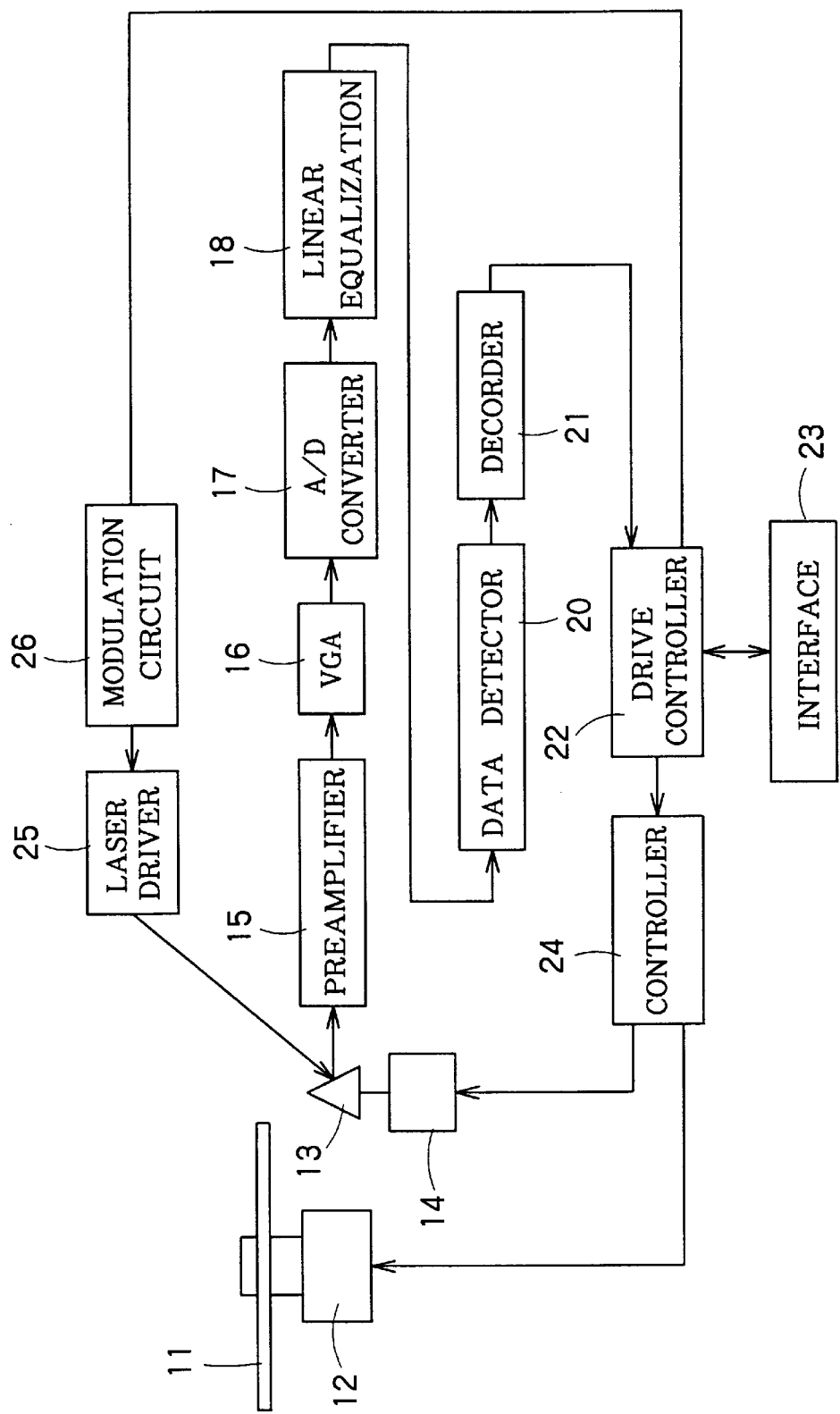
F I G. 5

US 6,396,792 B1

RECORDING METHOD OF A PHASE CHANGE OPTICAL RECORDING MEDIUM AND RECORDING APPARATUS

BACKGROUND OF THE INVENTION

This invention relates to a recording method of a phase change optical recording medium and recording apparatus. More particularly, the invention relates to a method and apparatus for recording and reproducing information by irradiating an optical beam onto a phase change optical recording medium, improved in erasability than conventional ones.

Optical recording mediums for recording and reproducing information by irradiation of an optical beam are available for large capacities, quick access and portability, and therefore used in storage means for computers and for video and audio files. Their further development is still being expected. Especially, phase change optical recording mediums are hopeful to be one of the leading mainstreams of rewritable optical recording mediums because data can be readily overwritten thereon by irradiation of a single beam and because they are of the reflectivity-changeable reproduction type which facilitates compatibility with CD-ROM (compact disc read only memory).

Optical disc are explained below as an example of optical recording mediums.

Phase change optical discs are configured to record and reproduce information thereon by irradiating a recording beam modulated in optical intensity, basically using three power levels, namely, a first recording power level (Pa) for making an "amorphous mark" by once heating the recording layer to its melting point or a higher temperature to change it into a molten random state and then quench it to the room temperature by rapid cooling; a second recording power level (Pc) for making a "crystal space portion" by heating the recording layer to a temperature zone lower than its melting point and not lower than its crystallizing temperature and then gradually cooling it for crystallization; and a reproduction power level (Pr) for maintaining the recording medium below its crystallization temperature to read out information in a nondestructive mode.

For making an amorphous mark of a predetermined length in the recording track direction, it must be essentially sufficient to continuously irradiate light of the Pa level for a time corresponding to the length of the mark. Actually, however, continuous irradiation makes the temperature of the recording layer higher at the end of irradiation than at the start of irradiation, and results in undesirably making a droplet-shaped mark. Especially in the mark-length recording and edge detecting system which is advantageous from the viewpoint of the recording density, droplet-shaped marks cause fluctuation of edge positions of reproduced signals, and adversely affect the linear density.

Taking it into consideration, means for irradiating pulses of Pa level light has been used on conventional phase change discs, especially on phase change optical discs employing the mark length record edge detecting system. For example, a first-generation DVD-RAM (digital versatile disc-random access memory) recording pulse irradiation method using phase change discs was introduced in Nikkei Electronics, No. 1997.10.6, p.318. The use of pulses of Pa level light enabled recording with less fluctuation in mark edge positions and a high linear density.

Conventionally, however, with no particular consideration on the crystallizing level, Pc, there has been employed a technology of continuously irradiating a Pc level light beam to a portion to be crystallized for a time corresponding to its length. As disclosed on p. 318 of the same publication, Nikkei Electronics No. 1997.10.6, there is a technique of irradiating light of a power level other than the Pc level immediately after or before making an amorphous record mark among others to be crystallized. However, in almost all areas of the crystal space to be made among marks, optical beams of a predetermined intensity in the Pc level has been used. Japanese Patent Laid-Open Publication No. H 9-7176 also discloses a technique of irradiating beams in form of pulses onto portions for making record marks, but gives no teaching on irradiating beams in form of pulses onto portions for making crystal spaces.

SUMMARY OF THE INVENTION

The present invention takes the above-mentioned problems as its background. That is, through researches on various ways of irradiation of light upon making crystal spaces, the Inventor found that the use of Pc level light in form of pulses is remarkably effective for improving the erasability, and attained the present invention. The invention demonstrates its effects in all phase change optical discs, but it is particularly effective in its modes for recording from a non-initialized state, that is, in modes for recording crystal spaces in an as-depo amorphous state.

In order to improve the characteristics of a phase change optical disc and to improve, in particular, the overwrite erasability, the invention provides the recording method summarized below.

That is, according to the invention, there is provided a recording method of a phase change optical recording medium having a recording layer, comprising the steps of:

making an amorphous mark by irradiating laser light and thereby changing a part of the recording layer to an amorphous phase; and making a crystal space portion by irradiating laser light and thereby crystallizing a part of the recording layer, the step of making the crystal space portion including: a first step of irradiating laser light of a first power level; and a second step of irradiating laser light of a second power level different from the first power level, and the recording layer being substantially changed in temperature in accordance with the first step and the second step.

In a preferable mode, at least one of the first step and the second step is executed within a time shorter than a time required for the full width at half maximum of the laser light to pass through a point of the recording layer.

Especially when the phase change optical recording medium is a non-initialized medium in which the recording layer is initially amorphous before recording, the crystal space portion can be made effectively.

According to the invention, there is further provided a recording apparatus for a phase change optical recording medium having a recording layer, comprising:

means for making an amorphous mark by irradiating laser light and thereby changing the recording layer into an amorphous phase; and the means for making a crystal space portion by irradiating laser light and thereby crystallizing the recording layer, the means for making the crystal space portion being configured to execute a first step of irradiating laser light of a first power level, and a second step of irradiating laser light of a second power level different from the first power level.

In a preferable mode of the invention, the means for making the crystal space portion is configured to execute at least one of the first step and the second step within a time shorter than a time required for the full width at half maximum of the laser light to pass through a point of the recording layer.

In a specific example of the recording method according to the invention, for recording, erasing or reproducing information by irradiating onto a phase change optical disc those light beams of at least three power levels, namely, the first recording power level (Pa) for changing the recording layer into an amorphous phase, the second recording power level (Pc) for crystallizing the recording layer and the reproducing power level (Pr), at least the light of the second recording power level is formed into pulses between a peak level (Pc1) lower at least than the first recording power level and a bottom power level (Pc2) lower than Pc1, and crystal space portions can be made in the phase change recording layer by irradiating a row of these pulses of the light beam.

Temperature near the edge of the track in the phase change recording layer may be increased to a temperature zone promoting generation of crystal nuclei by irradiating light of the Pc1 level, and temperature near the center of the track in the phase change recording layer may be increased to a temperature zone promoting generation of crystal nuclei by irradiating light of the Pc2 level.

In the present invention, it is sufficient for the second recording power level of the erasure signal for crystallizing the recording layer to be divided into two or more steps, and it is also acceptable that the first recording power level for changing the recording layer amorphous is used in form of pulses as well, like the conventional technique. Stepping the second recording power level does not mean changing the level merely for the portion near the mark upon recording crystal spaces for the purpose of adjusting the position of the front end or rear end of an amorphous mark, but does mean the use of the pulse beam for making crystal spaces also in areas distant from the amorphous mark.

As set forth above, light of the second recording power level is formed into pulses, for example, between the peak level (Pc1) lower than the first recording power level and the bottom power level (Pc2) lower than Pc1. The upper limit of Pc1 is the power heating the recording layer to the melting point, and the lower limit of Pc2 is the power heating the temperature in the central portion of the track in the recording layer to the crystallization temperature. Within this range, Pc1 and Pc2 are determined to best meet the thermal response of the medium. By determining Pc1 and Pc2 in this manner, irradiation of light in the Pc1 level increases the temperature near the track edge in the phase change recording layer to the temperature zone promoting generation of crystal nuclei, and irradiation of light in the Pc2 level increases the temperature near the central part of the track in the phase change recording layer to the temperature zone promoting generation of crystal nuclei. As a result, the recording layer, throughout the entire area of the track width thereof, is maintained in the temperature zone promoting generation of crystal nuclei for a uniform time, and the overwrite erasability is improved.

It is when the initial status of the phase change recording layer before recording is amorphous, namely, when the disc is a non-initialized disc, that the invention is most effective. Non-initialized discs permit direct recording not through the step of initial crystallization of the as-depo amorphous status under special film-making conditions explained later. Recording on a non-initialized disc is executed by recording crystal spaces into the amorphous material rather than making amorphous marks. Therefore, the recording method according to the invention, which promotes crystallization (which, in other words, ensures a high erasability) promises the largest effect when applied to non-initialized discs.

According to the invention, by dividing the erasure signal into at least two kinds of steps upon making a crystal space, it is possible to maintain the recording film with a good balance in a temperature zone increasing the crystal nuclei generating frequency and in a temperature zone increasing the crystal growth rate, and the invention can therefore improve the overwrite erasability of a phase change optical recording medium.

Additionally, the invention is especially effective when used with a non-initialized disc. That is, the invention enables reliable recording of data on non-initialized discs which are available at a low cost, and its industrial advantage is great.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 2 is a schematic diagram showing a cross-sectional structure of a phase change recording medium used to execute the method according to the invention;

FIG. 3 is a graph diagram showing crystal growth temperatures of optical recording films and frequency of generating crystal nuclei depending upon the temperature;

FIG. 4 is a graph diagram showing a result of analysis of thermal response characteristics; and FIG. 5 is a block diagram showing a major part of an optical recording apparatus according to the invention.

DETAILED DESCRIPTION OF THE PREFERRED EMBODIMENTS

Explained below are embodiments of the invention with reference to the drawings.

Figure 1A:
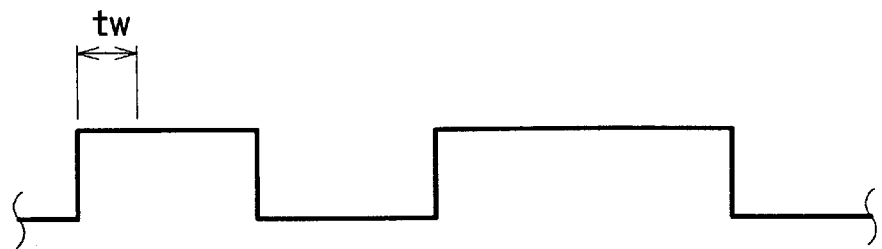
FIGS. 1A through 1E are schematic diagrams for explaining a specific example of a recording method of a phase change optical disc according to the invention.
Figure 1B:
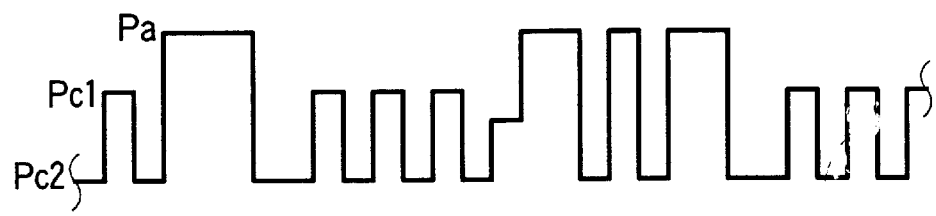
Figure 1C:
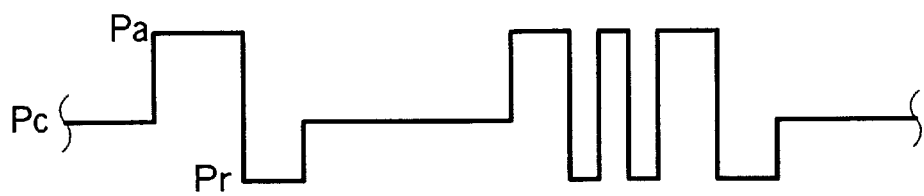
Figure 1D:
Figure 1E:

FIGS. 1A through 1E are schematic diagrams for explaining a specific example of a recording method of a phase change optical disc according to the invention. FIGS. 1A shows the waveform of a NRZI signal corresponding to lengths of a recording mark and a space; FIG. 1B shows the waveform of recording pulses; FIG. 1C shows the waveform of conventional recording pulses; FIG. 1D shows a rough sketch of a TEM image of a mark and a space which are made by overwriting (OW) on a previously recorded long mark by using recording pulses according to the invention; and FIG. 1E shows a rough sketch of a TEM image of a mark and a space which are made by OW on a previously recorded long mark by using conventional recording pulses. In these figures, tw is the window width, Pa is the recording level, Pc is the conventional erasure level (also called "bias power 1"), Pr is the reproduction level (also called "bias power 2"), and Pc1 and Pc2 are at least two kinds of erasure steps used as erasure signals according to the invention.

In case of a DVD-RAM whose single side capacity is 2.6 GB, for example, since the minimum length involving a recording mark and a space is 0.41 $\mu$m/bit under 8/16 modulation, the physical recording mark length is 0.615 $\mu$m, and it corresponds to 3 tw. Therefore, taking it into consideration that the linear velocity is 6 m/s (second), tw becomes 34 ns (nanoseconds).

On the other hand, the FWHM (full width at half maximum) diameter of the laser beam is approximately 0.5 μm when the light source wavelength is 650 nm and NA of the object lens is 0.6. Therefore, the time required for FWHM of the laser spot to pass through the medium is 83 ns.

That is, when using a pulse having the length of 2.44 tw, a portion exhibiting substantially the same thermal response as obtained by DC irradiation is made on the medium. In conventional techniques, although actually used recording pulses were determined to be shorter than 2.44 tw during recording (during making an amorphous mark), quasi-DC irradiation using pulses as long as 3.5 tw was employed during erasure even in a portion corresponding to the shortest space.

In the example shown in FIGS. 1A through 1E, the rear end of the space from a previous mark, a recording mark with the pulse length of 3 tw, space of 3 tw, mark of 5 tw and space to a subsequent mark are recorded sequentially from the left on the drawing sheet.

Taking such a case, first explained is a recording method according to a conventional technique. Conventionally, a row of recording pulses as shown in FIG. 1C was used. That is, in a space forming portion, light of a constant Pc level is irradiated. upon making an amorphous mark, after a delay of 0.5 tw from the rising edge of the NRZI signal, light of the Pr level having the pulse length of tw is irradiated subsequently to the pulse of the Pa level having the pulse length of 1.5 tw for 3 tw. For recording the space portion to the next mark, DC light of the Pc level is irradiated. For the mark of 5 tw, after a delay of 0.5 tw, light of the Pr level with the length of tw, light of the Pa level with the length of 0.5 tw, light of the Pr level with the length of 0.5 tw, light of the Pa level with the length of tw and light of the Pr level with the length of tw follow sequentially, and DC light of the Pc level is irradiated until the next mark is made.

In general, length of an amorphous mark is 3 tw at shortest and 11 tw at longest, and lengths as many as the natural numbers are assigned between them. Then, used as a basic row of pulses are the Pa light with the length of tw at the initial rising, subsequent repetition of Pr light with the length of 0.5 tw and Pa light of 0.5 tw up to the last pulse, Pa light with the length of tw as the last pulse, and Pr light of tw as an off pulse next to the last pulse. For a row of pulses as long as 3 tw in which the distance between the first pulse and the last pulse is short, the row is made up only of the first pulse of the Pa level with the length of 1.5 tw and the off pulse of the Pr level with the length of tw. For a row as long as 4 tw, an off pulse with the length of 0.5 tw comes between the first pulse and the last pulse.

There are proposed various recording methods as variations, such as a method of setting the power of the off pulse to an appropriate low power level other than the Pr level, a method of setting the length of the last pulse to a value other than tw, a method of using a pre-heat pulse slightly raised from the Pc level immediately before the first pulse, a method of optimizing each pulse width in accordance with the thermal response of the medium, and so on. Conventionally, however, for portions to make spaces, DC light of the Pc level was irradiated.

In contrast, the recording method according to the invention is characterized in the use of pulses in space making portions, i.e., for making crystallized portions. FIG. 1B shows a specific example thereof. The way of applying pulses in portions for making amorphous marks may be the same as, or a modification of, the conventional mode, or DC light of the Pa level or any other light is acceptable. FIG. 1B shows a row of pulses for making amorphous marks, as used in the above-mentioned DVD-RAM whose single side capacity is 2.6 GB.

In the present invention, the portion for making crystal spaces is in form of pulses as shown in FIG. 1B. Erasure pulses are made up of pulses of two kinds levels lower than the Pa level, namely, power levels Pc1 and Pc2, for example. At least one of the Pc1 pulse and the Pc2 pulse is shorter than the time required for the full width at half maximum of the laser beam to pass a point on the medium. Alternatively, pulse widths of Pc1 and Pc2 are shorter at least than the time corresponding to the length of the shortest mark space.

When taking DVD-RAM with the capacity of 2.6 GB as an example, since the shortest space is 3 tw, the corresponding time is 102.5 ns, and there is an interval of 0.5 tw from the rising of NRZI to the start of actual recording, the conventional technique continues DC irradiation of light in the Pc level for approximately 120 ns in the portion corresponding to the shortest space.

In contrast, in the present invention, the irradiation time may be set shorter than 120 ns for each of the light in the Pc1 level and the light in the Pc2 level light. For conspicuously obtaining the effects of the invention, widths of Pc1 and Pc2 are preferably shorter than the time required for FWHM of the laser spot to pass through the medium. In case of 2.6 GB DVD-RAM, it is preferably 83 ns or less as referred to above. It is more desirable that pulse widths of Pc1 and Pc2 are not larger than the pass-through time of FWHM, such as, for example, tw or 0.5 tw. As a modified example, Pc1 and Pc2 may be equal in time width.

Also regarding the levels of Pc1 and Pc2, they are not limited to those shown in FIG. 1B. For example, although FIG. 1B shows the Pc2 level as being equal to the level of the last pulse during recording of a mark, the Pc2 level may be set in any other level different from the level of the last pulse during recording of a mark. That is, while setting the last pulse during recording of a mark in the reproduction power level (Pr) under the crystallization temperature as shown in FIG. 1C, the Pc2 level may be set in a level not lower than the crystallization temperature and lower than Pc1.

As explained later in greater detail with reference to FIGS. 3 and 4, it is desirable that the Pc1 level be set to heat the recording layer to a temperature promoting crystal growth of the recording layer and the Pc2 level be set to heat the recording layer to a temperature promoting generation of crystal nuclei in the recording layer.

For example, if the pulse width of Pc1 is very short, then the level may be approximately equal to or higher than Pa. However, as shown in FIGS. 1A through 1E, if the pulse width is approximately equal in both the period for making an amorphous mark and the period for making a crystal space, then the Pc1 level is preferably lower than Pa.

It is also acceptable that a plurality of power levels lower than the Pa level are set in addition to the Pc1 and Pc2 levels, and the pulse width may be equal in all of the plurality of power levels.

The example shown in FIG. 1B uses two levels (Pc1 and Pc2) which are typical and easiest to work, and the pulse width of each level is 0.5 tw. The timing between the first pulse and the last off pulse during creation of an amorphous mark can bet determined adequately. For example, the level may be changed from Pc1 to Pa, Pc2 to Pa, or to Pa after once returning it to the conventionally used Pc level. The essential of the present invention lies in the crystallization power level in form of pulses to ensure the entire area in the width direction of the recording track uniformly passes the temperature zone promoting generation of crystal nuclei.

Explained below is a result of actual recording on a phase change disc by using the row of pulses shown in FIG. 1B to confirm effects of the invention.

FIG. 2 shows a cross-sectional structure of a phase change recording medium used to execute the method according to the invention. In FIG. 2, reference numeral 1 denotes a carbonate substrate having the diameter of 120 mm and the thickness of 0.6 mm. Numeral 2 refers to a 10 nm thick Au (gold) semi-transparent film, 3 to a 85 nm thick ZnS-SiO$_2$ first interference film, 4 to a 10 nm thick GeSbTe recording film, 5 to a 30 nm thick ZnS-SiO$_2$ second interference film, and 6 to a 100 nm thick Al alloy film. Although FIG. 2 shows only one side of an optical disc, the invention is similarly applicable also to a double-side disc having the same structure on the back surface of the substrate 1 as well.

The disc having the structure shown in FIG. 2 was prepared in the process shown below. First, the polycarbonate substrate 1 was made by injection molding using a stamper having a DVD-RAM format written thereon. Films on the substrate were formed consecutively by using a multi-chamber sputtering apparatus. Typically used conditions were used for making films. That is, Ar (argon) was used as the sputtering gas, the gas pressure was 0.67 Pa, and the sputtering power was hundreds W. After making the films, the substrate was taken out, and a disc substrate having no film thereon was bonded onto the Al alloy reflection film 6 via a UV setting adhesive. After that, the recording film 4 was initially crystallized by using an initializing apparatus to obtain the disc shown in FIG. 2.

The disc prepared in this manner was set in a phase change disc record/reproducing evaluation apparatus, and a recording test was conducted by driving it under the condition of the linear velocity of 6 m/s. In FIGS. 1A through 1E, conditions were set as Pa: 11 mW, Pc: 5.5 mW, Pc1: 6.2 mW, Pc2: 4.8 mW, and Pr: 1 mW. Pc1 and Pc2 were experimentally determined so as to optimize 3 tw-CNR and effective erasability.

By investigation of initial recording characteristics by the use of the row of pulses according to the invention (FIG. 1B) and the row of pulses used in the conventional technique (FIG. 1C) as pulses to be applied onto the track after initialization. As a result, the random jitter exhibited a practical value, 8%, under any pulse conditions.

After that, overwriting was repeated by respective rows of pulses. No change was found in jittering value when using the row of pulses according to the invention. On the other hand, with the conventional rows of pulses, he jitter increased gradually, by 8.5% at one hundred times and by 9% at one thousand times.

After alternately recording test signals of two single frequencies 3 tw and 11 tw instead of a random pattern, CNR and effective erasability were investigated. As a result, when using the row of pulses according to the invention, CNR was 54 dB for 3 tw even after repeating overwriting, and effective erasability (11 tw→3 tw) was 38 dB. However, when using the conventional row of pulses, CNR and erasability were observed to gradually deteriorate.

For the purpose of locating reasons of the deterioration, the Inventor made an amorphous band by continuously irradiating pulses for making an amorphous state on the track, next recorded random data, and observed marks through TEM (transmission electron microscope). FIGS. 1D and 1E are schematic diagrams showing planar configurations of recorded marks by the present invention and the conventional technique, and cross-hatched portions are amorphous portions. These marks are illustrated in alignment with pulse waveforms in FIGS. 1A through 1C.

As shown in FIG. 1E, in case of the conventional row of pulses used for quasi-DC irradiation of light onto crystallization space portions, a "fail-to-erase" portion in the amorphous band remained near the center of the track in a space portion. The "fail-to-erase" portion exhibited a form disappearing at the rear end of the mark, then appearing in a central part and continuing to the next mark. The reason why the "fail-to-erase" portion did not exist in a partial area at the rear end of a mark probably lay in that a crystallization ring was produced at the rear end of the mark when the level dropped to the off pulse after the last pulse.

On the other hand, with the row of pulses according to the invention, no "fail-to-erase" portion was found as shown in FIG. 1D.

Next explained is the mechanism of crystal space portions being made effectively by the present invention.

FIG. 3 is a graph diagram showing crystal growth temperatures of optical recording films and frequency of generating crystal nuclei depending upon the temperature. That is, the abscissa represents crystal growth rate Rg and frequency of generating crystal nuclei vx, and the ordinate represents temperatures. Along the ordinate, Tx represents crystallization temperature, and Tm represents melting temperature (melting point), respectively. It is apparent from FIG. 3 that the temperature corresponding to the peak of the crystal growth rate Rg is higher than the temperature corresponding to the peak of the crystal nuclei generating frequency vx. That is, between the crystallization temperature Tx and the melting point Tm, generation of crystal nuclei is more active than crystal growth under a lower temperature zone whereas crystal growth is more active than generation of crystal nuclei under a higher temperature zone. In FIG. 3, a boundary between the lower temperature zone and the higher temperature zone is determined for convenience, and this is labeled with Tn. The boundary temperature Tn, however, is not but an example, and any temperature can be determined appropriately as their boundary, depending upon the structure of the optical disc.

Taking the above-explained temperature dependency into consideration, the Inventor made numerical analysis of thermal response characteristics of an optical disc having the structure shown in FIG. 2.

FIG. 4 is a graph diagram showing the analysis of thermal response characteristics. That is, FIG. 4 shows thermal response of a portion for making a crystal space at a track position. The curve B is a result of the conventional recording method, and the curve C is a result of the recording method according to the invention.

As a spot of light is getting nearer to a certain position in a central part of the track, the temperature increases, and the temperature of the recording layer exceeds the crystallization temperature (Tx) in due course, passing the temperature zone with a high crystal nuclei generating frequency vx in the period between Tx to Tn. In the conventional recording method (B of FIG. 4), the recording film is maintained at the temperature zone with a high crystal nuclei generating frequency only in the time zone shown by tB1 where the spot approaches and in the time zone shown by tB2 where the spot goes apart, and in the other time zone, the recording layer is maintained in the temperature zone near the melting point (where the crystal growth rate Rg is high but the crystal nuclei generating frequency vx is low). That is, in the conventional method, the recording layer is heated to the temperature zone promoting crystal growth before crystal nuclei are produced sufficiently, and only a small amount of crystal nuclei produced in the amorphous portion is permitted to grow. As a result, crystallization does not progress sufficiently, and "fail-to-erase" portions are produced as shown in FIG. 1E to deteriorate the erasability accordingly.

In contrast, according to the invention, by applying the crystallization level power in form of pulses, the temperature increases and decreases in a central part of the track as shown at C in FIG. 4, in response to erasure pulses. In this specific example, since the level moves in a pulse-like fashion between Pc1 and Pc2 in intervals of 0.5 tw, the recording layer is maintained in the temperature zone with a high crystal nuclei generating frequency in the time zones tC1, tC2, tC3 and tC4, and it is maintained in the temperature band exhibiting a high crystal growth rate in the other time zones. That is, generation of crystal nuclei and crystal growth take place with a good balance, and crystallization progresses smoothly. As a result, as shown in FIG. 1D, crystallization without "fail-to-erase" portions is realized as shown in FIG. 1D, and the overwrite erasability is improved.

That is, in order to ensure the effects of the present invention, it is desirable to set the Pc1 level shown in FIG. 1B so as to heat the recording layer to a temperature making the crystal growth rate Tg more prominent and to set the Pc2 level so as to heat the recording layer to a temperature making the crystal nuclei generating frequency vx more prominent.

Practically, the difference between the maximum temperature of the recording layer at the laser irradiation of Pc1 level and the minimum temperature of the recording layer at the laser irradiation of Pc2 level may be larger than 50° C., and the difference may preferably larger than 100° C. and most preferably larger than 200° C.

Additionally, as apparent from the foregoing explanation, the invention is similarly applicable to all recording layers having characteristics in which the peak temperature zone of the crystal growth rate Rg is different from the temperature zone of the crystal nuclei generating frequency vx, and ensures the same effects.

Next explained is a specific example applying the invention to an initially amorphous disc. The multi-layered structure of the optical disc used in this example is approximately equal to that shown in FIG. 2, except that it is a so-called non-initialized disc which enables optical recording directly from the as-depo amorphous status, by changing the film-stacking conditions of the interference films 3, 5 and the recording film 4 from those of the foregoing example. More specifically, by decreasing the gas pressure to 0.1 Pa upon stacking the interference films, and conducting high-speed deposition by increasing the sputtering power to 1 kW, a compressive stress was positively given to the recording film. For stacking the recording film, by using Kr (krypton) as the sputtering gas, raising the gas pressure to 5 Pa while reducing the sputtering power to 100 W or less, energies of Ge, Sb and Te sputtering particles introduced onto the substrate surface were reduced, and the cooling rate of the sputtering particles on the substrate was decreased to a level approximately equal to that for optical recording. By employing this process, recording direct from the as-depo amorphous status is made possible.

Using the non-initialized disc prepared in this manner, the method of the invention was executed, using the same recording mode conditions as those of the preceding embodiment. When the recording method according to the invention was applied to the non-initialized disc, characteristics equivalent to those of the above-mentioned disc optically recorded after the initializing step were obtained.

On the other hand, when the conventional recording method was used for a non-initialized disc, the erasability was unstable during 10 times of overwriting from the initial recording, and the reproduction signal level in space portions fluctuated every overwriting interval. Since non-initialized discs are stronger in amorphous property than initialized optical discs, it is important to promote generation of crystal nuclei within several intervals of overwriting from the initial recording. In this respect, the recording method according to the invention can be asserted to be effective especially for non-initialized discs. Non-initialized discs need no initializing step for fabrication thereof, and are therefore advantageous in being supplied to the market at a low cost. The present invention can reliably use such economical non-initialized discs, and its industrial advantage is great.

Next explained is an optical recording apparatus according to the invention.

FIG. 5 is a block diagram showing a major part of the optical recording apparatus according to the invention. That is, the optical recording apparatus shown here is a record/reproducing optical disc apparatus also having the reproducing function, and includes an optical disc 11 as a recording medium, optical pickup 13, data reproducing system, data recording system, drive controller 22, and interface 23. The optical disc 11 is rotated with a driving force from a spindle motor 12. the optical pickup 13 is adjusted in movement by a serve motor 14, and irradiate laser light onto the optical disc 11 with a driving force from a laser driver 25 to optically record or reproduce information. The spindle motor 12 and the servo motor 14 are driven and controlled by the drive controller 22 via a drive control circuit 24.

The data recording system includes the laser driver 25 and a modulator circuit 26. the modulator circuit 26 executes coding processing for converting a recording data sent from the drive controller 22 into a predetermined row of code bits. The laser driver 25 drives the optical pickup 13 to have it record a mark in accordance with the row of code bits output from the modulator circuit 26 onto the disc 11.

The data reproducing system (reproduction signal processing circuit) includes a pre-amplifier 15, variable gain amplifier (VGA) 16, A/D converter circuit 17, linear equalizer circuit 18, data detector circuit 20, and decoder 21. The pre-amplifier 15 and VGA 16 amplify the reproduction signal read out by the optical pickup 13. The A/D converter circuit 17 converts the amplified reproduction signal into a digital form which is a quantized, sampled value of discrete periods of time.

The linear equalizer circuit 18 is a kind of digital filters. The data detector circuit 20 is a signal processing circuit based on maximum likelihood estimation, which detects data from a reproduction signal waveform equalized by partial response, for example. It may be a viterbi decoder. The decoder 21 restores the original data (recording data) from the row of code bits detected by the data detector circuit 20. The serial signal reproduction system is not essential in the present invention, the apparatus used in the invention may include the data recording system alone.

The drive controller 22 is a main control device of the apparatus shown here. It is connected to a personal computer or a television receiver set, for example, via an interface 23 to execute transfer control of recording/reproduction data. The apparatus employed here further includes, although not shown, a moving image compressing circuit necessary for recording or reproducing video information, moving image expansion circuit, and error detecting correcting circuit for detecting and correcting errors in data demodulated by the demodulator circuit 20.

Creation of erasure pulses for crystal space portions, which is one of important features of the invention, is executed in the modulator circuit 26, for example. That is, the modulator circuit 26 executes coding to convert recording data sent from the drive controller 22 into a row of code bits. In this process, it generates a row of erasure pulses including Pc1 and Pc2 shown in FIGS. 1A through 1E as a signal for making crystal space portions.

As explained with reference to FIGS. 3 and 4, the row of erasure pulses is determined to heat the recording layer of the recording medium to a temperature zone increasing the crystal growth rate Rg and to a temperature zone increasing the crystal nuclei generating frequency vx. Therefore, kinds of pulses forming the row or erasure pulses, levels of the pulses, widths of the pulses, number of the pulses, and so forth, are determined appropriately, taking the material of the recording layer and the optical property of the laser into consideration.

Additionally, the apparatus may be configured to permit the row or erasure pulses to be adjusted from outside via the interface 23.

According to the invention, by using the erasure signal for making crystal space portions in form of pulses, it is possible to provide an optical recording apparatus overcoming the "fail-to-erase" problem and improved in overwrite erasability.

Additionally, the optical recording apparatus according to the invention is particularly effective when used with non-initialized discs. That is, as already explained, by using the erasure signal for making crystal space portion in form of pulses, crystallization can be promoted. Therefore, the invention also promises a further effect of reliably recording information on a non-initialized disc.

Heretofore, the invention has been explained by way of embodiments with reference to specific examples. The invention, however, it not limited to these specific examples.

For example, power levels and lengths of respective pulses for making crystal spaces can be determined appropriately, in accordance with the nature of the recording medium used.

Additionally, the structure of the optical disc can be appropriately modified as well. Any skilled in the art will be able to obtain the same effects by using the present invention also when appropriately selecting materials of the multi-layered structure or its individual layers.

Moreover, the recording layer may be made of any selected from various reflective materials such as chalcogen-based materials involving InSbTe, AgInSbTe, GeTeSe and others, in addition to above-proposed GeSeTe.

Furthermore, although the foregoing specific examples have been explained as using an optical disc as an optical recording medium, the invention is not limited to it. The invention is similarly applicable also to other various types of optical recording mediums such as optical recording card, for example, and it promises the same effects.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No. H10-292263 filed on Oct. 14, 1998 including specification, claims, drawings and summary is incorporated herein by reference in its entirety.

What is claimed is:

1. A recording method of a phase change optical recording medium having a recording layer, comprising:
    making an amorphous mark by irradiating laser light and thereby changing a part of said recording layer to an amorphous phase; and
    making a crystal space portion by irradiating laser light and thereby crystallizing a part of said recording layer,
    said making the crystal space portion including:
        irradiating laser light of a first power level; and
        irradiating laser light of a second power level different from said first power level, said recording layer being substantially changed in temperature in accordance with said first and second power levels,
    wherein said irradiating laser light with at least one of the first and second power levels is performed within a time shorter than a time required for the full width at half maximum of said laser light to pass through a point of said recording layer.

2. The recording method of a phase change optical recording medium according to claim 1, wherein temperature near the center of a track in said recording layer is increased to a temperature zone promoting growth of crystal by said irradiating laser light of said first level, and temperature near the center of the track in said recording layer is increased to a temperature zone promoting generation of crystal nuclei by said irradiating laser light of said second level.

3. The recording method of a phase change optical recording medium according to claim 1, wherein temperature near the edge of a track in said recording layer is increased to a temperature zone promoting generation of crystal nuclei by said irradiating laser light of said first level, and temperature near the center of the track in said recording layer is increased to a temperature zone promoting generation of crystal nuclei by said irradiating laser light of said second level.

4. The recording method of a phase change optical recording medium according to claim 1, wherein said phase change optical recording medium is a non-initialized medium in which said recording layer is initially amorphous before recording.

5. The recording method of a phase change optical recording medium according to claim 1, wherein said first power level is higher than said second power level, and a difference between the maximum temperature of said recording layer by said irradiating laser light of said first level and the minimum temperature of said recording layer by said irradiating laser light of said second level is larger than 50° C.

6. The recording method of a phase change optical recording medium according to claim 5, wherein said difference between the maximum temperature of said recording layer by said irradiating laser light of said first level and the minimum temperature of said recording layer by said irradiating laser light of said second level is larger than 100° C.

7. The recording method of a phase change optical recording medium according to claim 6, wherein said difference between the maximum temperature of said recording layer by said irradiating laser light of said first level and the minimum temperature of said recording layer by said irradiating laser light of said second level is larger than 200° C.

8. A recording apparatus for a phase change optical recording medium having a recording layer, comprising
    means for making an amorphous mark by irradiating laser light and thereby changing said recording layer into an amorphous phase; and
    means for making a crystal space portion by irradiating laser light and thereby crystallizing said recording layer,
    said means for making the crystal space portion being configured to irradiate laser light of a first power level and irradiate laser light of a second power level different from said first power level, and thereby substantially changing the temperature of said recording layer in accordance with said first and second power levels,
    wherein said means for making the crystal space portion is configured to irradiate laser light with at least one of said first and second power levels within a time shorter than a time required for the full width at half maximum of said laser light to pass through a point of said recording layer.

9. The recording apparatus for a phase change optical recording medium according to claim 8, wherein temperature near the center of the track in said recording layer is increased to a temperature zone promoting growth of crystal by said laser light of said first power level, and temperature near the center of the track in said recording layer is increased to a temperature zone promoting generation of crystal nuclei by said laser light of said second power level.

10. The recording apparatus for a phase change optical recording medium according to claim 8, wherein temperature near the edge of the track in said recording layer is increased to a temperature zone promoting generation of crystal nuclei by said laser light of said first power level, and temperature near the center of the track in said recording layer is increased to a temperature zone promoting generation of crystal nuclei by said laser light of said second power level.

11. The recording apparatus for a phase change optical recording medium according to claim 8, wherein said first power level is higher than said second power level and the difference between the maximum temperature of said recording layer when irradiated by said light of said first power level and the minimum temperature of said recording layer when irradiated by said light of said second power level is larger than 50° C.

12. The recording apparatus for a phase change optical recording medium according to claim 11 wherein said difference between the maximum temperature of said recording layer when irradiated by said light of said first power level and the minimum temperature of said recording layer when irradiated by said light of said second power level is larger than 100° C.

13. The recording apparatus for a phase change optical recording medium according to claim 12, wherein said difference between the maximum temperature of said recording layer when irradiated by said light of said first power level and the minimum temperature of said recording layer when irradiated by said light of said second power level is larger than 200° C.

14. A recording apparatus for a phase change optical recording medium having a recording layer, comprising:
    an optical pickup which irradiates laser light onto said recording medium; and
    a data recording system which includes a laser driver driving said optical pickup, and a modulator circuit creating erasure pulses of said laser light for making crystal space portion in said recording layer, said erasure pulses including a first pulse of a first power level and a second pulse of a second power level different from said first power level, and thereby substantially changing a temperature of said recording layer in accordance with said first pulse and said second pulse,
    wherein at least one of said first and second pulses has a width within a time shorter than a time required for the full width at half maximum of said laser light to pass through a point of said recording layer.

15. The recording apparatus for a phase change optical recording medium according to claim 14, further comprising a data reproducing system.

16. The recording apparatus for a phase change optical recording medium according to claim 14 wherein said first power level is higher than said second power level, and the difference between the maximum temperature of said recording layer corresponding to said first pulse and the minimum temperature of said recording layer corresponding to said second pulse is larger than 50° C.

17. The recording apparatus for a phase change optical recording medium according to claim 14 wherein said difference between the maximum temperature of said recording layer corresponding to said first pulse and the minimum temperature of said recording layer corresponding to said second pulse is larger than 100° C.

18. The recording apparatus for a phase change optical recording medium according to claim 14 wherein said difference between the maximum temperature of said recording layer corresponding to said first pulse and the minimum temperature of said recording layer corresponding to said second pulse is larger than 200° C.

* * * * *